June 24, 1941.   C. B. GRAVES   2,247,197
MANUFACTURE OF HELICALLY WOUND TUBING WITH IMPERVIOUS LINING
Filed July 26, 1939   3 Sheets-Sheet 2
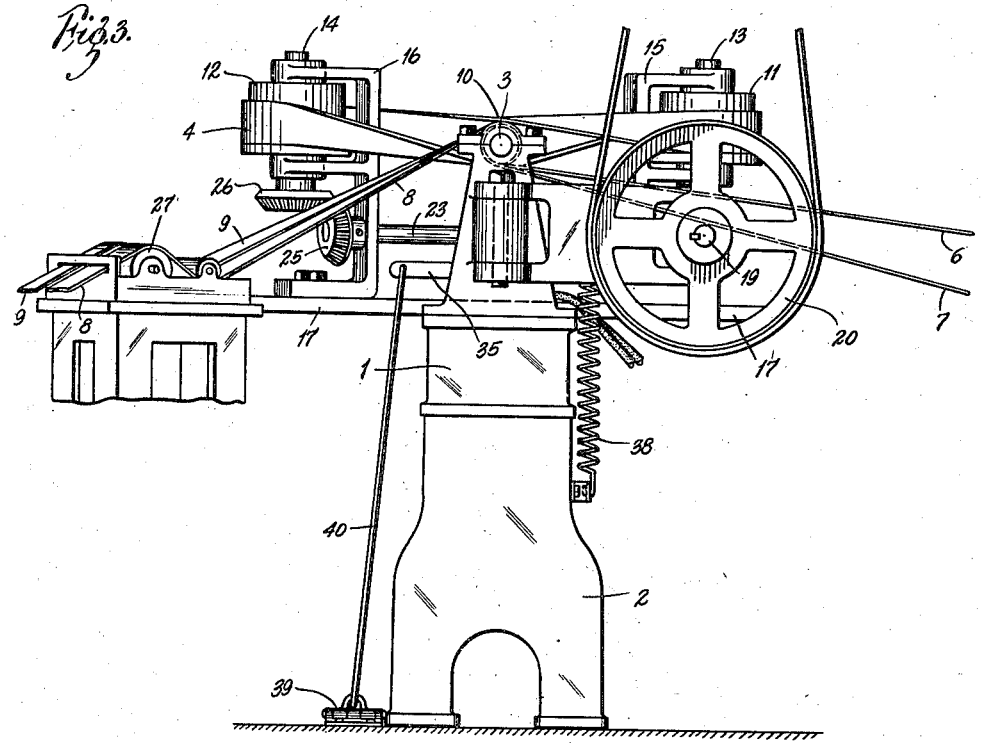
Fig. 3.
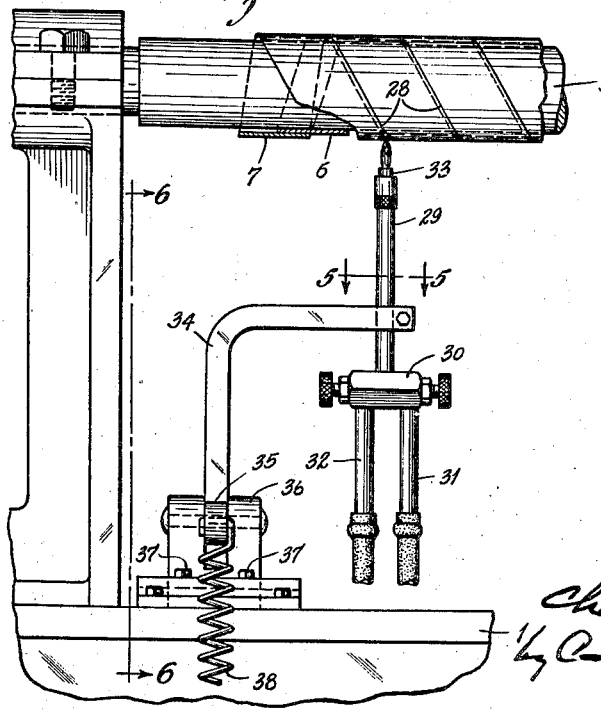
Fig. 4.
Fig. 5.
INVENTOR:
Charles B. Graves
HIS ATTORNEYS.

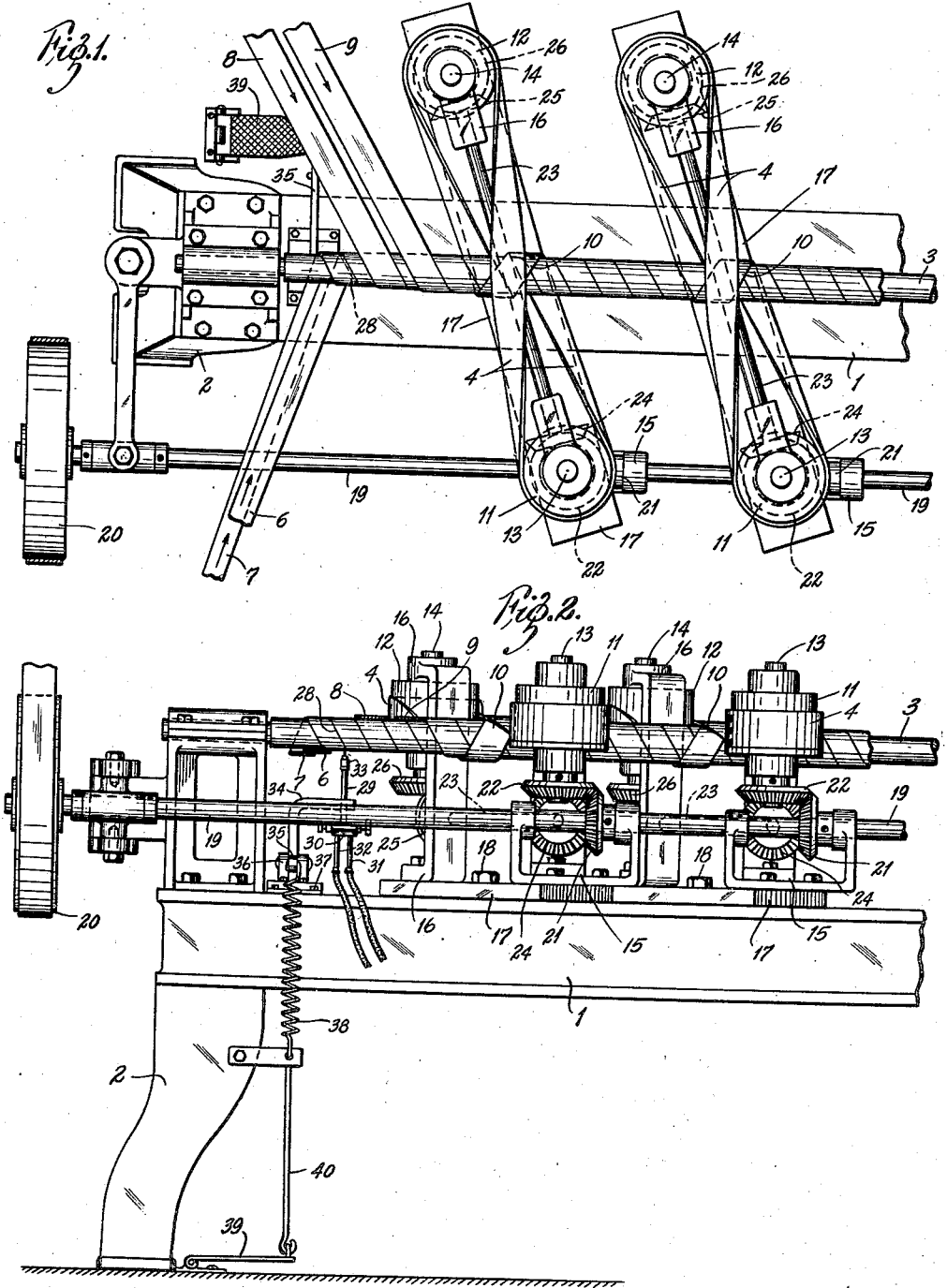

June 24, 1941.　　　C. B. GRAVES　　　2,247,197
MANUFACTURE OF HELICALLY WOUND TUBING WITH IMPERVIOUS LINING
Filed July 26, 1939　　　3 Sheets-Sheet 3
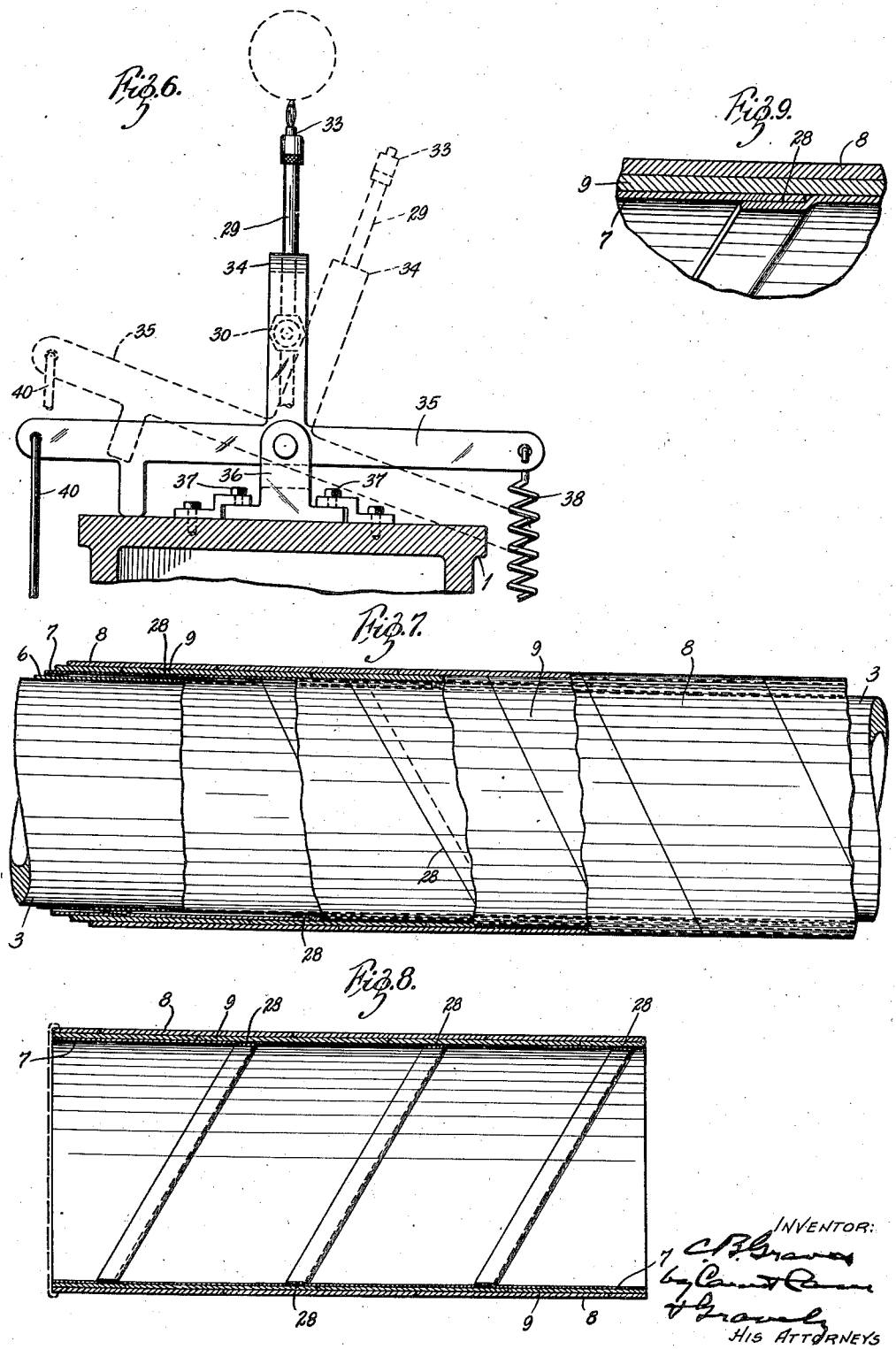

Patented June 24, 1941

2,247,197

UNITED STATES PATENT OFFICE 2,247,197

MANUFACTURE OF HELICALLY WOUND TUBING WITH IMPERVIOUS LINING

Charles B. Graves, Maplewood, Mo., assignor to The Sefton Fibre Can Company, Maplewood, Mo., a corporation of Delaware Application July 26, 1939, Serial No. 286,562

8 Claims. (Cl. 93—80)

This invention relates principally to the manufacture of helically wound fiber tubing of the kind used for can bodies. It has for its principal object to produce a cheap and practical process of and apparatus for quickly and easily embodying in such tubing a strip of impervious, heat sealable lining material having its margins helically overlapped and hermetically sealed by the application of heat and pressure thereto during the manufacture of said tubing. Another object of the invention is to provide for the application of the heat to the lap-joint of the lining immediately prior to the application of pressure thereto. Another object is to provide for discontinuing the application of the heat when the winding operation is discontinued. The invention consists in the process and apparatus hereinafter described and claimed. In the accompanying drawings, which form a part of this specification and wherein like symbols refer to like parts wherever they occur.

Fig. 1 is a plan view of a portion of a helical tube winding apparatus embodying my invention, Fig. 2 is a side elevation of the machine shown in Fig. 1, Fig. 3 is an end elevation of said machine, Fig. 4 is an enlarged fragmentary side elevation of the machine in the region of heat applying mechanism, Fig. 5 is a horizontal section on the line 5—5 in Fig. 4, Fig. 6 is a vertical section on the line 6—6 in Fig. 4, Fig. 7 is a part sectional and side elevational view showing the tubing and lining on the mandrel, Fig. 8 is a longitudinal sectional view through a section cut from said tubing to form a lined can body; and Fig. 9 is an enlarged fragmentary longitudinal section through the wall of the tubing at one of the joints between the overlapped marginal edges of the helically wound lining strips.

In the accompanying drawings, my invention is illustrated in connection with a helical tube winding machine comprising a frame or table 1 provided at one end with a pedestal 2, a stationary longitudinal mandrel 3 supported at one end in said pedestal, and one or more endless belts 4 for successively winding a plurality of strips 6, 7, 8 and 9 helically about said mandrel and for pressing the helically wound strips together on the mandrel and for sliding them axially thereof. Each of said belts is a crossed belt that is disposed at an oblique angle to the mandrel axis and has its lower stretch wrapped around the mandrel in a helical coil 10 so as to exert an angular thrust on the tube being formed to thereby slide the same endwise along said mandrel. Each of these endless winding, pressing and feeding belts is trained around and driven by a pair of pulleys 11 and 12 fixed to vertical shafts 13 and 14, respectively, located one on each side of the mandrel 3. The pulley shafts 13 and 14 are journaled in suitable bearings provided therefor in upstanding brackets 15 and 16, respectively, secured to the opposite ends of a plate 17 that rests on and is rigidly secured by a bolt 18 to the top of the table 1. A horizontal main drive shaft 19 having a belt driven pulley 20 thereon extends longitudinally of the table and is rotatably supported in suitable bearings provided therefor in the supporting brackets 15 for the vertical shafts 13 for the pulleys 11. This horizontal drive shaft has bevel drive gears 21 thereon, which intermesh with bevel gears 22 fixed to the shafts 13 for the pulleys 11 and the drive is transmitted between each pair of pulley shafts 13 and 14 through a cross shaft 23 that is journaled in the brackets 15 and 16 and is provided with bevel gears 24 and 25 that intermesh respectively with the bevel gear 22 on the pulley shaft 13 and a bevel gear 26 on the pulley shaft 14.

The strips 6, 7, 8 and 9 are supplied from suitable rolls (not shown), the two outermost strips 8 and 9 being drawn over a roller 27 that rotates in liquid adhesive contained in a suitable reservoir and is adapted to apply a coating of said adhesive to the underside of each of said strips, whereby the adhesive on the underside of the strip 9 serves to secure said strip to the strip 8 and the adhesive on the underside of the strip 8 serves to secure this strip to the strip 7. Each of the two outermost strips 8 and 9 is made of relatively thick paper or fiberboard and is wound in the form of a right-hand helix with the adjacent edges of successive turns in abutting relation and with the joints of one strip offset with respect to the joints of the other strip. The innermost strip 6 is made of relatively thin paper; and this strip, together with the strip 7, is wound in the form of a left-hand helix with its convolutions in edgewise abutting relation.

The strip 7, which forms a lining for the tubing, is preferably made of a thin transparent impervious material that becomes cohesive or self sealing upon the application of heat thereto. A material having such characteristics has become known under the trade name of "Pliofilm" which is made from a rubber base and is also waterproof and oilproof and resistant to attack by most materials which might be packed in cans made from the sections cut from the hereinbefore described helically wound tubing. One of the characteristics of this material is that it tends to cling closely to anything in contact therewith. Accordingly, the thin strip 6 of paper or other suitable material is wound helically around the mandrel in advance of the strip of "Pliofilm" so as to prevent the latter from adhering to said mandrel and prevent feeding of the tubing lengthwise thereof. This helically wound paper strip 6 is used only for the purpose of preventing the "Pliofilm" from clinging to the mandrel and is easily withdrawn from the tubing after it is removed from the mandrel.

As shown in the drawings, the lining strip 7 of "Pliofilm" is wound around the mandrel with its adjacent side edges helically overlapped, as at 28. These continuously overlapped edges are hermetically sealed by applying heat thereto immediately prior to the winding of the two fiberboard strips 8 and 9 around the helically wound and overlapped "Pliofilm" lining strip and just before the application of pressure thereto by the belts 4. As shown in the drawings, such heat is preferably applied by means of a gas burner 29 having a mixing chamber 30, air and gas inlet pipes 31 and 32 leading to said chamber, and a nozzle 33 leading from said chamber and located below the mandrel 3 in a position to cause the flame from said nozzle to impinge on the overlapped edges 28 of the first two turns of the "Pliofilm" lining strip 7 before the same is covered by the inner fiberboard strip 8. By this arrangement the application of heat to the overlapped side edges 28 of the helically wound "Pliofilm" lining strip 7 effects an autogenous union or weld therebetween.

As shown in the drawings, the burner 29 is mounted on an upstanding arm 34 of a lever 35 that is pivoted for vertical swinging movement on a block 36 that is secured to the top of the table for adjustment longitudinally thereof by suitable clamp screws 37. The lever extends on opposite sides of the table and a coil tension spring 38 has one end secured to one end of said lever and the other end anchored to said table below the top thereof whereby the downward pull of said spring tends to rotate said lever on its pivot and swing the burner 29 clear of the mandrel. The burner is held directly beneath the mandrel during the operation of winding the tube by means of a pedal 39 which has a link connection 40 with the other end of the lever 35, said lever being provided with a suitable stop lug which abuts against the top of the table and thus positions said burner immediately below the mandrel when the pedal is depressed.

By the arrangements described, the "Pliofilm" lining is readily incorporated in the tubing during the winding thereof and is adhesively secured to the fiber strip; the overlapping edges of the helically wound "Pliofilm" lining strip are heat sealed and integrally connected together to form a continuous and permanent seal therebetween. The heat is applied directly to the helically overlapped edges of the "Pliofilm" lining strip prior to the winding of the two body forming fiber strips 8 and 9 therearound; and the application of pressure by the belts 4 to such overlapped and heated edges immediately after the application of the heat insures a perfect and permanent union therebetween. When the winding operation is discontinued, the pedal is released and the spring pulls the burner supporting lever downwardly thereby swinging the burner to one side of the mandrel and thus preventing burning of the "Pliofilm" lining. The thin helically wound paper strip which prevents the "Pliofilm" strip from sticking to the mandrel, is withdrawn from the finished tube after the removal thereof from the mandrel. The tubing may then be cut into can body sections of the desired length.

What I claim is:

1. The process of manufacturing helically wound tubing with an impervious lining of heat sealable material which consists in helically winding a strip of such material about a mandrel with its edge portions overlapped and with a helically wound separating strip interposed between said helically wound lining strip and said mandrel, helically winding a body forming strip about said helically wound lining strip, applying heat to the overlapped edges of said lining strip as it is being wound around said mandrel and just before it is covered by said body strip, applying external pressure to said tubing before it leaves the mandrel to more securely seal the overlapped and heated edges of said helically wound lining strip and removing said separating strip after said tubing leaves said mandrel.

2. The continuous process of manufacturing helically wound tubing with a lining of heat sealable material which consists in simultaneously helically winding a lining strip of such heat sealable material around a mandrel and a body strip around the wound lining strip while moving the wound lining and body strips along and about the axis of said mandrel, and heat sealing adjacent edges of said wound lining strip by applying heat directly to the external peripheral surface thereof as it moves around and longitudinally of said mandrel just after it is wound thereon and just before it is covered by the wound body strip.

3. The continuous process of manufacturing helically wound tubing with an impervious lining of heat sealable material which consists in simultaneously helically winding a lining strip of such heat sealable material around a mandrel with its edge portions overlapped and a body strip around the wound lining strip while moving the wound lining and body strips along and about the axis of said mandrel, and heat sealing the overlapped edges of said wound lining strip by applying heat directly to the external peripheral surface thereof as it moves around and longitudinally of said mandrel just after it is wound thereon and just before it is covered by the wound body strip.

4. The continuous process of manufacturing helically wound tubing with an impervious lining of heat sealable material which consists in simultaneously helically winding a lining strip of such impervious heat sealable material around a stationary mandrel with its edge portions overlapped and a body strip around the wound lining strip while moving the wound lining and body strips along and about the axis of said mandrel, heat sealing the overlapped edges of said wound lining strip by applying heat directly to the external peripheral surface thereof as it moves around and longitudinally of the mandrel just after it is wound thereon and just before it is covered by the wound body strip, and applying continuous external radial pressure to the wound body strip just after it is wound around the wound lining strip.

5. The continuous process of manufacturing lined helically wound tubing which consists in simultaneously helically winding a lining strip of Pliofilm or the like around a stationary mandrel with its edge portions overlapped and a body strip of fiberboard or the like around the wound Pliofilm lining strip with an adhesive disposed therebetween while moving the wound Pliofilm lining and fiberboard body strips along and about the axis of said mandrel, sealing the overlapped edges of said wound Pliofilm lining strip by applying heat to the external peripheral surface thereof as it moves around and longitudinally of the mandrel just after it is wound thereon and just before it is covered by the wound fiberboard body strip, and applying continuous radial pressure to the external surface of the wound fiberboard body strip just after it is wound around the wound Pliofilm lining strip.

6. In a tube winding apparatus, a non-rotary mandrel, means for helically winding a lining strip of impervious heat sealable material around said mandrel and a strip of body forming material around the helically wound lining strip and for moving the wound lining and body strips along and about the axis of said mandrel during said winding operation, and means for applying heat directly to the external peripheral surface of the wound lining strip to heat seal adjacent edges thereof as it moves about and axially of said mandrel just after it is wound thereon and just before it is covered by the wound body forming strip.

7. In a tube winding apparatus, a non-rotary mandrel, means for helically winding a lining strip of impervious heat sealable material around said mandrel with its edges overlapped and a strip of body forming material around the wound lining strip and for moving the wound strips along and about the axis of said mandrel during said winding operation, and a burner for applying a flame directly to the external peripheral surface of said helically wound lining strip to heat seal the overlapped edges thereof as it moves about and axially of said mandrel just after it is wound thereon and just before it is covered by the wound body forming strip.

8. In a tube winding apparatus, a non-rotary mandrel, means for helically winding a lining of impervious heat sealable material around said mandrel and a strip of body forming material around the wound lining strip and for moving the wound strips along and about the axis of said mandrel during said winding operation, and means for applying a flame to the external peripheral surface of the wound lining strip to heat seal adjacent edges thereof as it moves about and axially of said mandrel just after it is wound thereon and just before it is covered by the wooden body forming strip, said means comprising a burner mounted for movement towards and away from said mandrel.

CHARLES B. GRAVES.